US010034140B2

(12) United States Patent
Yoon et al.

(10) Patent No.: US 10,034,140 B2
(45) Date of Patent: Jul. 24, 2018

(54) METHODS, APPARATUSES, SYSTEMS, AND NON-TRANSITORY COMPUTER READABLE MEDIA FOR SHARING LOCATION INFORMATION

(71) Applicant: LINE Corporation, Shibuya-ku, Tokyo (JP)

(72) Inventors: Seok Jang Yoon, Tokyo (JP); Eun Sil Lee, Tokyo (JP)

(73) Assignee: Line Corporation, Tokyo (JP)

( * ) Notice: Subject to any disclaimer, the term of this patent is extended or adjusted under 35 U.S.C. 154(b) by 0 days.

(21) Appl. No.: 15/203,030

(22) Filed: Jul. 6, 2016

(65) Prior Publication Data
US 2017/0019768 A1    Jan. 19, 2017

(30) Foreign Application Priority Data
Jul. 14, 2015    (KR) .................. 10-2015-0099938

(51) Int. Cl.
*H04W 4/02*    (2018.01)
*H04L 29/06*    (2006.01)
(Continued)

(52) U.S. Cl.
CPC ............. *H04W 4/028* (2013.01); *H04L 67/04* (2013.01); *H04L 67/18* (2013.01); *H04L 69/28* (2013.01);
(Continued)

(58) Field of Classification Search
CPC ......... H04L 67/22; H04L 67/18; H04L 69/28; H04L 12/1831; H04L 29/08675;
(Continued)

(56) References Cited

U.S. PATENT DOCUMENTS

| 8,942,727 B1 * | 1/2015 | Roman ................... H04L 67/18 455/404.2 |
| 9,247,377 B2 * | 1/2016 | Pai ......................... H04W 4/02 |

(Continued)

FOREIGN PATENT DOCUMENTS

KR    2014-0137070 A    12/2014

OTHER PUBLICATIONS

Office Action dated Apr. 26, 2016.

*Primary Examiner* — George Eng
*Assistant Examiner* — Umair Ahsan
(74) *Attorney, Agent, or Firm* — Harness, Dickey & Pierce, P.L.C.

(57) ABSTRACT

A method of sharing, with one or more external devices, a location of a first device, includes transmitting a first location information signal to at least one external device; receiving a second location information signal from the at least one external device in response to the first location information signal; generating a location share window, the location share window including visual display of location information of the first device and the at least one external device, based on the first and second location information signals; measuring a desired time lapse period from a reference time point; and deleting the location share window when the measured time lapse period is greater than or equal to a first period, wherein the reference time point is a point in time when the location share window is created.

20 Claims, 21 Drawing Sheets

(51) Int. Cl.
*H04W 4/029* (2018.01)
*H04W 4/06* (2009.01)
*H04L 29/08* (2006.01)

(52) U.S. Cl.
CPC ............ *H04W 4/029* (2018.02); *H04L 67/306* (2013.01); *H04W 4/06* (2013.01)

(58) Field of Classification Search
CPC ..... H04L 41/0681; H04L 51/20; H04L 51/24; H04L 67/24; H04L 67/325; H04L 67/42; H04W 4/02; H04W 64/00; H04W 4/023; H04W 4/028
See application file for complete search history.

(56) References Cited

U.S. PATENT DOCUMENTS

| | | | |
|---|---|---|---|
| 9,413,707 B2* | 8/2016 | Roman | H04L 51/24 |
| 2008/0070593 A1* | 3/2008 | Altman | H04L 63/102 |
| | | | 455/457 |
| 2008/0132252 A1* | 6/2008 | Altman | G06Q 30/0207 |
| | | | 455/457 |
| 2012/0302256 A1* | 11/2012 | Pai | H04W 4/02 |
| | | | 455/456.2 |
| 2014/0351351 A1* | 11/2014 | Yu | H04L 51/20 |
| | | | 709/206 |
| 2016/0033289 A1* | 2/2016 | Tuukkanen | G01C 21/3415 |
| | | | 701/522 |
| 2016/0295384 A1* | 10/2016 | Shan | H04W 4/02 |
| 2016/0371973 A1* | 12/2016 | Holleczek | G08G 1/0129 |

* cited by examiner

METHODS, APPARATUSES, SYSTEMS, AND NON-TRANSITORY COMPUTER READABLE MEDIA FOR SHARING LOCATION INFORMATION

CROSS-REFERENCE TO RELATED APPLICATION

This U.S. non-provisional application claims the benefit of priority to Korean Patent Application No. 10-2015-0099938, filed on Jul. 14, 2015, in the Korean Intellectual Property Office, the disclosure of which is incorporated herein in its entirety by reference.

BACKGROUND

1. Field

One or more example embodiments relate to methods, apparatuses, systems, and/or non-transitory computer readable media for sharing location information.

2. Description of the Related Art

As electronic communication technologies are developed, a variety of functions may be utilized via a device that performs electronic communication. The device may include a personal computer (PC), a portable terminal, or the like. A user may install various programs to and delete various programs from the device without limitation, and the device may directly connect to a communication network by using a wireless communication network, such as the Internet. Accordingly, the device may send and receive various signals to and from an external device.

A location-based service may be implemented by using the device. The location-based service enables a plurality of devices to exchange signals that include information about locations of the devices and makes it possible to easily find the current locations by using a location share window that displays the current locations. Since it is possible to find a location of a person or a vehicle through a mobile communication base station or a global positioning satellite (GPS), the location-based service may be used in industry of all fields of society, such as in E-commerce, traffic control, environmental protection, medicine, administration, etc., as well as mobile communication services such as searching for friends, searching for dating partners, emergency relief, navigation for vehicles, location-based content, and traffic information.

However, since revealing one's own location to others makes it difficult to protect personal information, a management method in this regard is desired.

SUMMARY

One or more example embodiments include a location information service providing method that enables the sending and receiving of location information signals including information about locations of devices and the interruption of sending and receiving the location information signal when a condition is satisfied, and/or a non-transitory computer readable media for executing the method.

One or more example embodiments include a location share service providing method that enables the sharing of both simple location information and a variety of information when sending and receiving location information signals including information about locations of devices between devices, and/or a non-transitory computer readable media for executing the method.

Additional aspects will be set forth in part in the description which follows and, in part, will be apparent from the description, or may be learned by practice of one or more of the presented example embodiments.

According to one or more example embodiments, a method of sharing, with one or more external devices, a location of a device, which performs electronic communication with the one or more external devices, is provided. The method includes transmitting, using at least one processor, a first location information signal to at least one external device, receiving, using the at least one processor, a second location information signal from the at least one external device in response to the first location information signal, generating, using the at least one processor, a location share window, the location share window including visual display of location information of the device and the at least one external device, based on the first and second location information signals, measuring, using the at least one processor, a desired time lapse period from a reference time point, and deleting, using the at least one processor, the location share window when the measured time lapse period is greater than or equal to a first period, wherein the reference time point is a point in time when the location share window is created.

The measuring may include receiving, using the at least one processor, an initialization request signal for initializing the measured lapse period from at least one of the device and the one or more external devices, and changing, using the at least one processor, the reference time point based on the initialization request signal.

The deleting may include receiving, using the at least one processor, an adjustment request signal for adjusting a length of the first period from at least one of the device and the at least one device, and adjusting, using the at least one processor, the length of the first period based on the adjustment request signal.

The deleting may include deleting, using the at least one processor, the location share window when a current time is a first time.

The deleting may include receiving, using the at least one processor, a delete notification signal, indicating a deletion of the location share window, from a server configured to store information about the location share window, interrupting, using the at least one processor, the transmitting and receiving of the location information signal between the device and the at least one external device, and deleting, using the at least one processor, the location share window.

The method may further include transmitting, using the at least one processor, a delete request signal, the delete request signal including a request to delete the location share window, to the server before the receiving of the delete notification signal.

The deleting may include interrupting the transmitting of the location information signal of the device to the at least one external device, and exiting from the location share window.

The method may further include receiving, using the at least one processor, a distance information signal including distance information related to a distance between a first location and each of the at least one external device, and controlling, using the at least one processor, displaying of the distance information visually in the location share window based on the distance information signal, wherein the first location is the location of the device or at least one location set by at least one of the device and the at least one external device.

The method may further include receiving, using the at least one processor, a battery remaining capacity information signal including battery remaining capacity information related to a remaining battery capacity of each of the at least one external device, and controlling, using the at least one processor, displaying of the battery remaining capacity information visually in the location share window based on the battery remaining capacity information signal.

The method may further include receiving, using the at least one processor, a moving speed information signal including moving speed information related to a moving speed of each of the at least one external devices, and controlling, using the at least one processor, displaying of the moving speed information visually in the location share window based on the moving speed information signal.

The controlling of the displaying of the moving speed information may include estimating, using the at least one processor, a transportation type information, by which each of the at least one external device moves, based on the moving speed of each of the at least one external device, and controlling, using the at least one processor, displaying of transportation type information visually in the location share window.

The method may further include setting, using the at least one processor, a first area on a map displayed on the location share window, and outputting, using the at least one processor, a notification when a location of each of the at least one external device is changed to inside of the first area from outside of the first area or is changed to the outside of the first area from the inside of the first area.

The method may further include interrupting, using the at least one processor, the transmitting of the location information signal of the device to the one or more external devices.

The interrupting of the sending the location information signal may include resuming, using the at least one processor, the transmitting of the location information signal of the device to the at least one external device.

According to one or more example embodiments, a method of providing location information of each of a plurality of devices to at least one of the plurality of devices is provided. The method includes receiving, using at least one processor, a location information signal of each of the plurality of devices from the at least one of the plurality of devices, transmitting, using the at least one processor, the received location information signal to the at least one of the plurality of devices, measuring, using the at least one processor, a time lapse period from a reference time point, and interrupting, using the at least one processor, the transmitting of the location information signal to the at least one of the plurality of devices when the measured time lapse period is greater than or equal to a first period, wherein an initial value of the reference time point is a point in time when the received location information signal is transmitted to the at least one of the plurality of devices.

The measuring includes receiving, using the at least one processor, an initialization request signal for initializing the measured lapse period from at least one of the plurality of devices, and changing, using the at least one processor, the reference time point based on the initialization request signal.

The interrupting includes receiving, using the at least one processor, an adjustment request signal for adjusting a length of the first period from at least one of the plurality of devices, and adjusting, using the at least one processor, the length of the first period based on the adjustment request signal.

The method may further include receiving, using the at least one processor, a specific information signal comprising at least one of distance information related to distances between the plurality of devices, battery remaining information related to each of the plurality of devices, and moving speed information related to each of the plurality of devices, and transmitting, using the at least one processor, the received specific information signal to the at least one of the plurality of devices.

According to one or more example embodiments, a non-transitory computer-readable recording medium having recorded thereon computer readable instructions, that when executed by at least one processor, cause the at least one processor to execute at least one of the methods for providing location information.

According to one or more example embodiments, a system of providing location information to a plurality of devices is provided. The system includes a memory having computer readable instructions stored thereon, and at least one processor configured to execute the computer readable instructions to periodically determine current location information using at least one location sensor, periodically transmit a location information message to at least one external device, the location information message including the determined current location information, periodically receive a second location information message from the at least one external device, the second location information message including current location information of the at least one external device, periodically generate a graphical user interface (GUI), the GUI including a map including the determined current location information, the current location information of the at least one external device, and a distance between the determined current location information and the current location information of the at least one external device, and display the GUI on a display panel.

The at least one processor may be further configured to execute the computer readable instructions to receive user input related to a desired time to discontinue the periodic transmission of the location information message, determine whether the desired time has been reached, and transmit a delete GUI message to the at least one external device, the delete GUI message including instructions causing the at least one external device to delete a GUI generated on the at least one external device.

The at least one processor may be further configured to execute the computer readable instructions to receive user input related to point of interest information related to a point of interest to be shared, transmit the point of interest information to the at least one external device, and wherein the map includes the point of interest information, a distance between the determined current location information and the point of interest information, and a distance between the current location information of the at least one external device and the point of interest information.

The at least one processor may be further configured to execute the computer readable instructions to receive user input related to boundary information of a desired area, transmit the boundary information to the at least one external device, and wherein the map includes the boundary information of the desired area, information related to whether the determined current information is located inside or outside of the desired area, and information related to whether the current location of the at least one external device is located inside or outside of the desired area.

According to one or more example embodiments, a location share service providing device that performs electronic communication with one or more external devices includes a communication unit configured to send and receive a location information signal with at least some of the one or more external devices, and a controller configured to create a location share window on which location information of each of the one or more external devices is visually displayed. The controller is configured to measure a lapse period from a reference time point. The controller is configured to delete the lapse period when the measured lapse period is greater than or equal to a first period. The reference time point is a point in time when the location share window is created.

The general and detailed aspects may be embodied using a system, an apparatus, a method, a non-transitory computer readable medium, or any combination of the system, the apparatus, the method, and the non-transitory computer readable medium.

The above and other aspects, features, and advantages will become apparent from the detailed description in conjunction with the claims.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
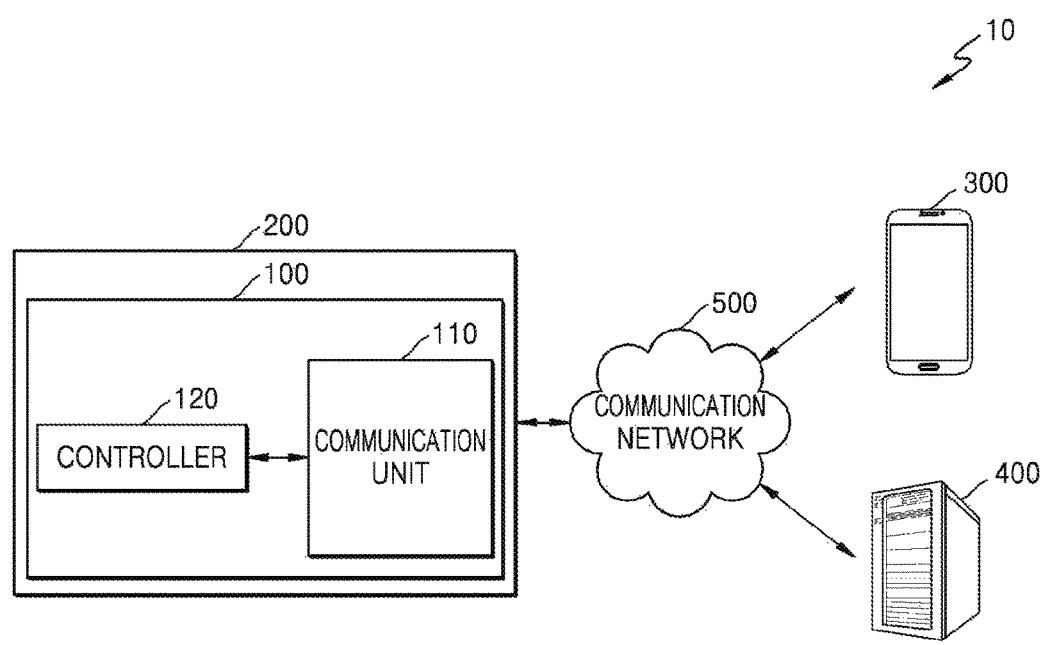
FIG. 1 is a drawing schematically illustrating a configuration of a location share service providing system according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 is a drawing schematically illustrating a configuration of a location share service providing system according to at least one example embodiment.

Referring to FIG. 1, the location share service providing system 10 may include a location share service providing device 100. Furthermore, the location share service providing system 10 may include a terminal 200 that includes the location share service providing device 100, an external terminal 300, a server 400, and a communication network 500, but is not limited thereto and may include greater or lesser amounts of constituent elements.

The location share service providing device 100 may be a device that performs electronic communication with one or more external devices. The location share service providing device 100 may be a device that is used to display the locations (e.g., current location information) of the terminal 200 and other terminals, such as the external terminal 300, on the terminal 200.

The location share service providing device 100 may provide a function of sharing locations of a plurality of users with each other. Here, a shared location of each user may be a current location of the terminal 200 and/or the external terminal 300, etc., or may be a fixed location that is designated by the terminal 200, the external terminal 300, etc. The location share service providing device 100 may receive a request message (hereinafter referred to as a "location share request") to mutually share his/her own location from a user, and may receive location information, which is included in the location share request, from one or more external terminals 300, the received location information including at least the location information related to the external terminal 300 associated with the user making the location share request. The location share service providing device 100 may share locations of the terminal 200 and/or the one or more external terminals 300 by providing the locations of the terminal 200 and the one or more external terminals 300 through a location share window displayed on a graphical user interface of the location share service. In other words, to share the locations of a plurality of users, a plurality of terminals may share their own locations through a location share request without sending specific messages to the other terminals because each of the location share requests include the location information of the respective terminal.

Additionally, the location share service providing device 100 may share a fixed location, which is designated by the terminal 200 and/or the one or more external terminals 300, as well as a current location of the location share service providing device 100. Here, the fixed location may mean a location that a user of the terminal 200 or the external terminal 300 determines as his/her own location. The fixed location may be a user specified location that is designated by tapping or clicking a specific location on a map while the map is displayed on the terminal 200 and/or the external terminal 300. Moreover, the user of the terminal 200 and/or the external terminal 300 may designate the fixed location by inputting a specific address into his/her own terminal. When the user of the terminal 200 and/or the external terminal 300 does not want to share his/her own current location, the location share service providing device 100 may set a location of the user to the fixed location such that the fixed location is shared instead of the current location of the user.

Further, the location share service providing device 100 may send an assent request message for requesting acceptance of a share request message to one or more external terminals 300 in response to the received location share request, and may receive the locations of the external terminal 300 that accepts the assent request (e.g., agrees to share their location). Furthermore, the location share service providing device 100 may provide location information that is on terminals of other users in the location share window to the external terminal 300 of the user who assents to share a location. However, the location share service providing device 100 may not provide the location information to the external terminal 300 of the user who does not assent (e.g., declines) to share a location.

The location share service providing device 100 may also receive a location-of-interest share request for sharing a location of interest that is provided by the external terminal 300. The location-of-interest request may be included in the location share window and may be shared with another external terminal, which may be included, or may not be included, in the location share window, in response to the location-of-interest share request. Here, the location-of-interest share request may include information related to at least one location of interest, and may be information related to an address, a location, and a company name, a geographic coordinate, a landmark name, and/or other identifying signifier.

The location share service providing device 100 may receive a target location share request for sharing a target location from the external terminal 300. The target share request may be included in the location share window and may share the target location with at least one external terminal, which may be included or may not be included in the location share window, in response to the target location share request. For example, the target location share request is a request for sharing a target location with all users belonging to a group may include an appointed and/or desired place/location to be shared among all or some of the users in the group. Furthermore, the target location share request may include information about a location to arrive at (e.g., directions to the location, instructions regarding entering/exiting the location, parking instructions, codes to disarm security alarms, codes used to gain entrance to a building/parking lot/etc., and/or the like), information about a time to arrive at the location, etc.

The location share service providing device 100 may send its own location, that is, a location of the location share service providing device 100 to the external terminal 300 in real time, periodically, and/or intermittently. Furthermore, the location share service providing device 100 may receive location information of the external terminal 300 provided from the external terminal 300 in real time, periodically, and/or intermittently. For example, the location share service providing device 100 may provide a location of the external terminal 300 to a user of the location share service providing device 100 in real time by applying the information, which is received within a desired first time period or in real time without delay to the location share window. According to at least some example embodiments, the "real time" may mean that location information is applied to the location share window without a delay period or may mean that location information is applied to the location share window within the desired first time. The first time period may be a time that is short enough to ensure the user of the location share service providing device 100 does not suffer any inconvenience.

The location share service providing device 100 may be a device that is included in the terminal 200. Additionally, the terminal 200 itself may be the location share service providing device 100. That is, the terminal 200 is a terminal in which an application or a computer program for a location share service is installed and/or an application or a computer program that may access a location share service over a network (e.g., a web browser that is configured to access a web-based location share service) is installed, and may be the location share service providing device 100. The location share service providing device 100 may include a communication unit 110 and a controller 120.

The communication unit 110 may send and receive a location information signal to and from each of one or more external devices. According to at least some example embodiments, the location information signal may include a first location information signal and a second location information signal. The first location information signal may be a signal for notifying the external terminal 300 of a location of the terminal 200. The first location information signal may be a signal that the location share service providing device 100 and/or the terminal 200 directly generates and sends to the outside. Additionally, the first location information signal may be a signal that the server 400, communicating with the terminal 200 over a wired and/or wireless network, generates and sends to the location share service providing device 100. The second location information signal may be a signal that includes location information of the external terminal 300. The external location information signal may be a signal that the external terminal 300 and/or the server 400 generates and sends to the location share service providing device 100. The communication unit 110 may send the first location information signal to the external terminal 300 and/or the server 400 and may receive the second location information signal therefrom. According to at least some example embodiments, the first location information signal may be a signal that includes real-time location information of the terminal 200, and the second location information signal may be a signal that includes real-time location information of the external terminal 300.

The communication unit 110 may be, but is not limited to, a Bluetooth communication unit, a Bluetooth low energy (BLE) communication unit, a near field communication unit, a wireless LAN (Wi-Fi) communication unit, a Zigbee communication unit, an infrared data association (IrDA) communication unit, a Wi-Fi direct (WFD) communication unit, a ultra-wideband (UWB) communication unit, an Ant+ communication unit, a cellular network communications unit (e.g., GSM, CDMA, etc.), a satellite communications unit, etc.

According to at least some example embodiments, the communication unit 110 may be included in an element that performs wired and/or wireless communication with an external electronic device on the terminal 200. Additionally, the element of the terminal 200 itself may be the communication unit 110 of the location share service providing device 100.

The controller 120 may control an overall operation of the location share service providing device 100.

The controller 120 may generate the location share window, in which pieces of location information of the terminal 200 and the external terminal 300 are visually displayed, based on at least the first and second location information signals.

The location share window may be a kind of user interface (UI) that is displayed on the location share service providing device 100 and/or the terminal 200. The location share window may be a graphical area (e.g., a user interface element) where the locations of the terminal 200 and/or the one or more external terminal 300 are displayed in a desired and/or fixed way. The location share service providing device 100 and/or the terminal 200 may display two or more location share windows at the same time. An example of the location share window that the controller 120 generates will be described with reference to FIGS. 4 and 5.

The controller 120 may measure a time lapse period from a reference time point. For example, an initial value of the reference time point may be a point in time when the location share window is created, but may be any desired point in time and may be configured to user preferences. In the case when the location share window is created according to a request of the terminal 200 and/or the one or more external terminal 300, the controller 120 may set a point in time when the location share window is created, as the reference time point. Afterwards, the controller 120 may measure the time lapse period indicating how a time elapses from the reference time point as well as storing and/or tracking the location information provided by each of the terminal 200 and/or external terminals 300.

Figure 8A:
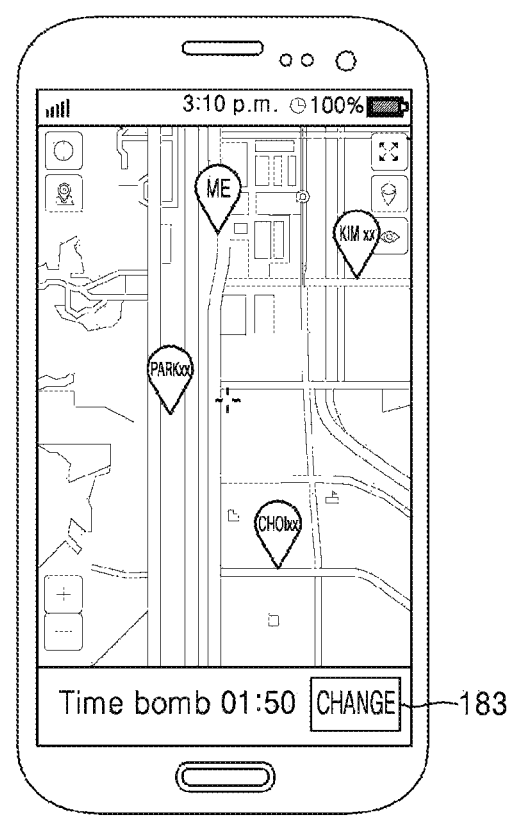
FIGS. 8A to 8C are drawings schematically illustrating an example in which a location share service is provided through the location share service providing method, according to some example embodiments.
Figure 8B:
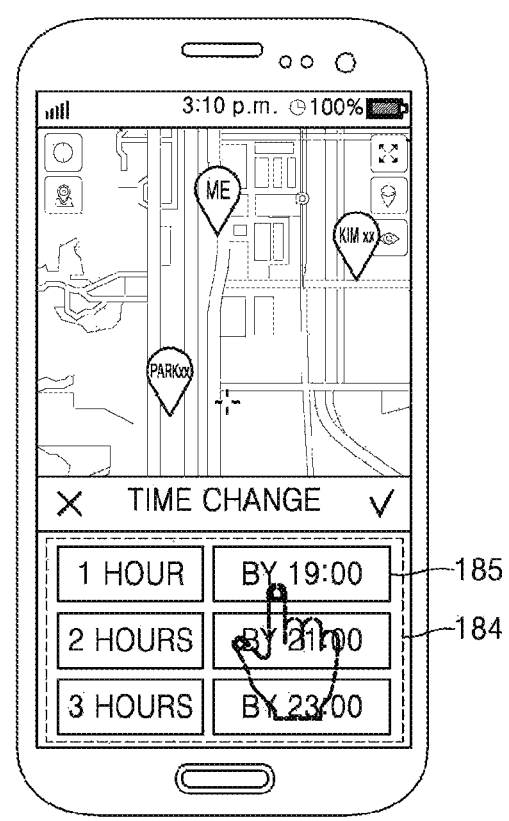

The controller 120 may delete the location share window when the measured lapse period is greater than or equal to a first period. The first period may be a reference period during which the location share window is maintained. A default value of the first period may be a value that is set in advance in the location share service providing device 100, or the user may configure the value of the first period at any time through the UI of the location share service. For example, the default value of the first period may be set to two hours in a memory of the location share service providing device 100. According to at least some example embodiments, when the controller 120 creates the location share window, the first period may be set to two hours. Furthermore, the first period may be adjusted according to a request of a user of the terminal 200 or a user of the external terminal 300. An example in which the first period is adjusted will be described with reference to FIGS. 6 and 8.

The controller 120 may include various types of devices capable of processing data, such as a processor. Here, the "processor" may mean a data processing device that is embedded in hardware and includes a circuit physically structured to perform a function expressed by code or instructions included in a program. For example, the data processing device embedded in the hardware may include processing devices such as, but not limited to, a microprocessor, a central processing unit (CPU), a processor core, a multiprocessor, a multicore processor, an application specific integrated circuit (ASIC), a field programmable gate array (FPGA), a distributed processing system, etc.

According to at least some example embodiments, the controller 120 may be included in an element, which controls an overall operation of the terminal 200, of the terminal 200. Additionally, the element of the terminal 200 itself may be the controller 120 of the location share service providing device 100.

Figure 2:
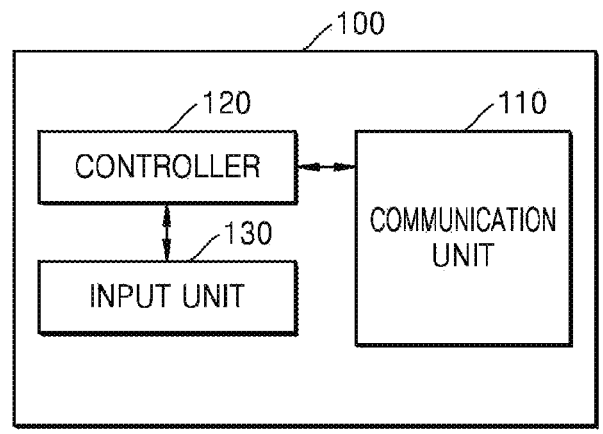
FIGS. 2 and 3 are block diagrams schematically illustrating an example of an internal configuration of the location share service providing device of FIG. 1 according to some example embodiments.

Referring to FIG. 2, the location share service providing device 100 may further include an input unit 130 in addition to the communication unit 110 and the controller 120, but is not limited thereto.

The input unit 130 may receive various requests from the user of the terminal 200. For example, the input unit 130 may receive inputs such as a request input for opening the location share window from the user of the terminal 200, a request input for initializing a lapse period measured by the controller 120, and a request input for adjusting a length of the first period. The input unit 130 may receive inputs of the user in various forms. For example, the input unit 130 may receive, but is not limited to, a voice input of the user, a character input of the user, an input generated when the user pushes a button, a touch input of the user, an observed gesture input of the user, etc.

According to at least some example embodiments, the input unit 130 may be included in an element that receives a user input at the terminal 200. Additionally, the element of the terminal 200 itself may be the input unit 130 of the location share service providing device 100. That is, a button, a touch sensor, etc. of the terminal 200 may be, but is not limited to, the input unit 130 of the location share service providing device 100.

Figure 3:
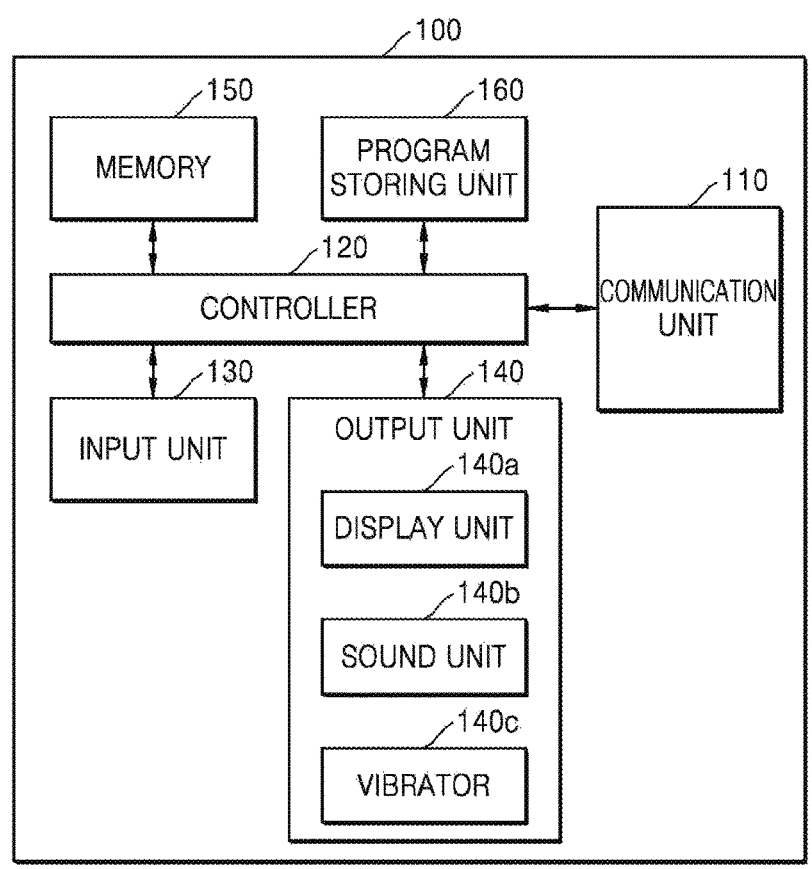

Referring to FIG. 3, the location share service providing device 100 may further include an output unit 140, a memory 150, and a program storing unit 160 in addition to the communication unit 110, the controller 120, and the input unit 130, but is not limited thereto.

The output unit 140 may output information associated with location sharing. The output unit 140 may output information associated with location sharing in various forms. To output information of various forms, the output unit 140 may include at least one of a display unit 140a, a sound unit 140b, a vibrator 140c, etc.

The display unit 140a may display the location share window visually. For example, the display unit 140a may display a user interface (UI) corresponding to the location share window in at least part of an area thereof. A map about a desired and/or fixed area and/or map locations respectively corresponding to persons participating in the location share window may be displayed on the UI. According to at least some example embodiments, when the first and second location information signals include real-time location information of the terminal 200 and the external terminal 3300, respectively, the display unit 140a may visually display information about real-time locations of the terminal 200 and/or the external terminal 300 through the location share window.

The display unit 140a may be or, alternatively, include at least one of displays such as, but not limited to, a liquid crystal display (LCD), a thin film transistor-liquid crystal display (TFT-LCD), an organic light-emitting diode (OLED), a flexible display, a three-dimensional (3D) display, an electrophoretic display, a projector, etc. The display unit 140a may also be a panel, and the pane may be touch-sensitive. The location share service providing device 100 may include two or more display units 140a according to at least one example embodiment of the location share service providing device 100.

According to at least some example embodiments, the display unit 140a may be embodied by an element that displays information processed at the terminal 200 (e.g., a display of the terminal 200). Additionally, a corresponding element of the display unit 140a itself may be the display unit 140a of the location share service providing device 100.

The sound unit 140b may output a sound notification to a user of the terminal 200 with regard to the location sharing. For example, the sound unit 140b may output a sound notification indicating that the location share service starts, a sound notification indicating that the location share service ends, and/or a sound notification indicating that the external terminal 300 enters a specific location or leaves the specific location. The sound unit 140b may output a sound of which a length, frequency, strength, pitch, or style is changed according to a type of the notification and/or based on a user defined sound setting.

The sound unit 140b may be or, alternatively, include, but is not limited to, a tuner, an equalizer, headphones, earphones, and/or at least one speaker of various forms. That is, the sound unit 140b may include various types of devices that generate a sound through an electrical or mechanical operation.

According to at least some example embodiments, the sound unit 140b may be included in an element that generates a sound at the terminal 200. Additionally, the element of the terminal 200 itself may be the sound unit 140b of the location share service providing device 100. For example, the sound unit 140b may be embodied by speakers of the terminal 200.

The vibrator 140c may output a tactile notification to a user of the terminal 200 with regard to the location share. For example, the vibrator 140c may output a notification indicating that the location share service starts, a notification indicating that the location share service ends, and/or a notification indicating that the external terminal 300 enters a specific location or leaves the specific location, by vibrating at least part of the terminal 200 or the vibrator 140a itself. The vibrator 140c may output a vibration of which a length, strength, or pattern is changed according to a type of the notification and/or based on a user defined sound setting.

The vibrator 140c may be, but is not limited to, a vibration motor or a vibration film. That is, the vibrator 140c may include various types of devices that generate a vibration through an electrical or mechanical operation. In addition, even though the term "vibration" is used here, the vibrator 140c may be a device that generates various forms of tactile effects such as an effect to poke, an effect to apply a pressure, an affect in which a small electrical current flows, etc.

According to at least some example embodiments, the vibrator 140c may be included in an element that generates a vibration at the terminal 200. Additionally, a corresponding element of the terminal 200 itself may be the vibrator 140c of the location share service providing device 100.

The output unit 140 may further include various elements each of which outputs a signal including information associated with data transmission.

The memory 150 may temporarily and/or permanently store data that the controller 120 processes. Here, the memory 150 may include, but is not limited to, non-transitory magnetic storage media, non-transitory flash storage media, etc. The memory 150 may store data that is sent or received to or from the external terminal 300 or the server 400.

According to at least some example embodiments, the memory 150 may be included in an element that temporarily and/or permanently stores data processed in the terminal 200. Additionally, the element of the terminal 200 itself may be the memory 150 of the location share service providing device 100.

The program storing unit 160 may be an element that includes software (e.g., computer readable instructions) that when executed by at least one processor, causes the at least one processor to perform various tasks supplementary and/or indispensable to a process of sending and receiving data associated with the location share window. In other words, the computer readable instructions of the software stored on the program storing unit 160, when executed by the at least one processor, transforms the processor into a special purpose processor configured to perform the computer readable instructions. The program storing unit 160 may be embodied by memory. The program storing unit 160 may be a portion of the memory 150. Alternatively, the program storing unit may be embodied by memory that is separate from the memory 150.

According to at least some example embodiments, the program storing unit 160 may be included in an element of the terminal 200 that includes software (e.g., computer readable instructions) performing various tasks supplementary and/or indispensable to drive the terminal 200. Additionally, the element of the terminal 200 itself may be the program storing unit 160 of the location share service providing device 100.

The terminal 200 and the external terminal 300 may be devices that exchange location information signals with each other in the location share service providing system 10 according to at least one example embodiment. Each of the terminal 200 and the external terminal 300 may be an electronic device that sends and receives data to and from any other device in a wired and/or wireless communication environment (e.g., a wired and/or wireless communication network). According to at least some example embodiments, the terminal 200 and the external terminal 300 may not be distinguished according to a physical property. For example, a device that includes the location share service providing device 100 and is the subject of the present description may be the terminal 200, and any other device that communicates with the terminal 200 may be the external terminal 300. The external terminal 300 may also include another location share service providing device.

Each of the terminal 200 and the external terminal 300 may be a device, and two physically distinct devices may be different devices. However, whether devices are equal to each other may be determined according to whether accounts that are logged into on a device are equal to each other. That is, a first terminal on which a first account is logged into and a second terminal on which the first account is logged into may be determined as one device.

Furthermore, the example embodiment shown in FIG. 1 as the external terminal 300 is included in the location share service providing system 10. However, the example embodiments are not limited thereto. For example, a plurality of external terminals 300 may be included in the location share service providing system 10 and may send and receive location information signals to and from the terminal 200 over the communication network 500.

According to at least one example embodiment as shown in FIG. 1, the external terminal 300 is a smart phone. However, the example embodiments are not limited thereto. As described above, an electronic device that sends and receives data to and from any other device in a wired/wireless communication environment may be used without limitation.

In detail, each of the terminal 200 and the external terminal 300 may be, but are not limited to, a desktop computer, a laptop computer, a tablet PC, a smart TV, a cellular phone, a personal digital assistant (PDA), a media player, a micro server, a global positioning system (GPS) device, an e-book terminal, a digital broadcasting terminal, a navigation device, a kiosk, an MP3 player, a digital camera, a wearable device, a gaming console, a virtual reality device, and/or any other mobile or non-mobile computing device. Furthermore, each of the terminal 200 and the external terminal 300 may include various devices, each of which receives touch inputs such as an electronic board and a touch table. Furthermore, each of the terminal 200 and the external terminal 300 may be an accessory, each of which has a communication function and a data processing function, such as, but not limited to, a watch, glasses, a hair band, a ring, etc.

The server 400 may be a server that is used to provide the location share service according to at least one example embodiment. While a single server is illustrated in FIG. 1, a plurality of servers may exist according to traffic or the amount of data according to other example embodiments. Further, the server 400 may store data that is exchanged between the terminal 200 and the external terminal 300. The server 400 may provide data, which is received from one or more of the terminal 200 and the external terminal 300, to the terminal 200, the external terminal 300, and one or more of electronic devices that are included in the location share service providing system 10. According to at least some example embodiments, the server 400 may provide data to the devices that the terminal 200 and/or the external terminal 300 providing the data intended the information for.

The server 400 may be a webserver that provides various services which improve convenience to a plurality of users, such as a search service as well as the location share service. That is, the server 400 may provide various services, such as a search service, an e-mail service, a blog service, a social networking service, a news service, and/or a shopping information providing service, etc., along with the location share service.

Additionally, the server 400 may be a server that is connected to a server providing portal services, such as a search service, an e-mail service, a news service, and/or a shopping service, etc., and provides a web page, which the portal service provides, to the terminal 200 requesting the portal service to provide information. Here, the server 400 and the portal service providing server may be servers that are physically separated from each other or may be implemented with the same server that is logically classified into the server 400 and the portal service providing server.

According to the at least one example embodiment shown in FIG. 1, the terminal 100 sends and receives data to and from the external terminal 300 over the communication network 500. However, according to some example embodiments, the data may be exchanged between the terminal 200 and the external terminal 300 through the server 400. For example, a location information signal may be sent from the terminal 200 to the server 400 over the communication network 500. Afterwards, the location information signal may be sent from the server 400 to the external terminal 300 over the communication network 500.

The communication network 500 may connect the terminal 200 with the server 400. Furthermore, the communication network 500 may connect the terminal 200 and the external terminal 300 with the server 400. Furthermore, the communication network 500 may directly connect the terminal 200 with the external terminal 300. That is, the communication network 500 may refer to a communication network providing a connection path such that data is exchanged between the terminal 200 and the external terminal 300 without being transmitted through the server 400. The communication network 500 may include wired networks such as, but not limited to, local area networks (LANs), wide area networks (WANs), metropolitan area networks (MANs), integrated service digital networks (IS-DNs), fiber optic networks, etc., and wireless networks such as, but not limited to, wireless LANs, code division multiple access (CDMA) networks, Bluetooth networks, satellite communication networks, etc.

Figure 4:
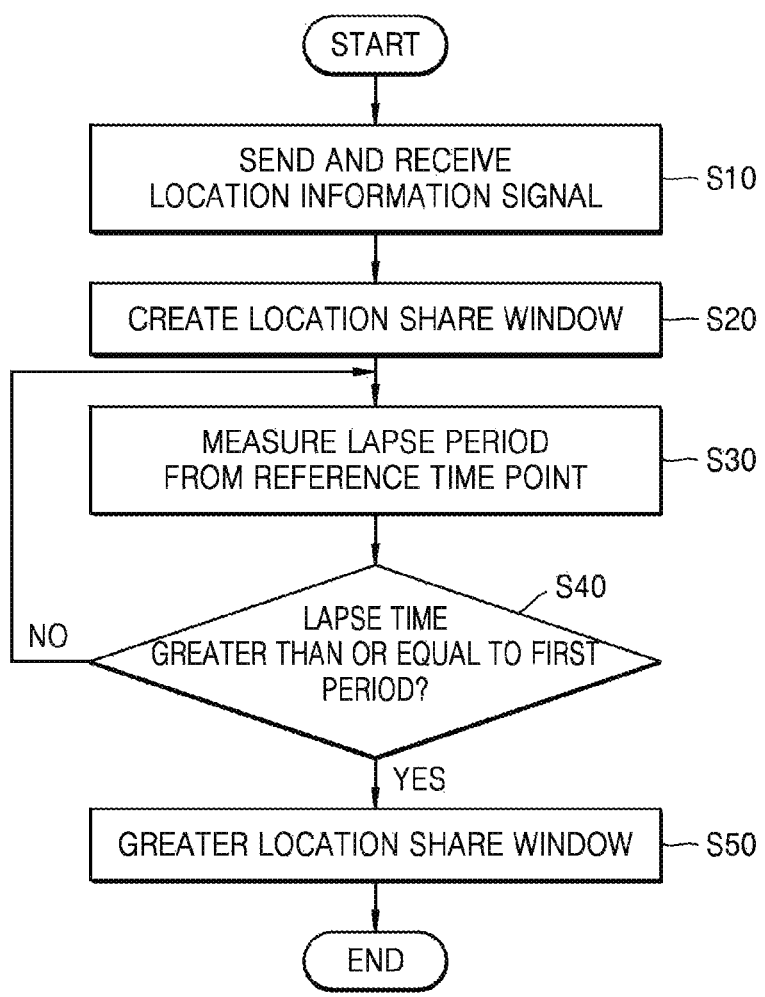
FIG. 4 is a flowchart diagram illustrating a method of providing a location share service, according to at least one example embodiment.
Figure 5A:
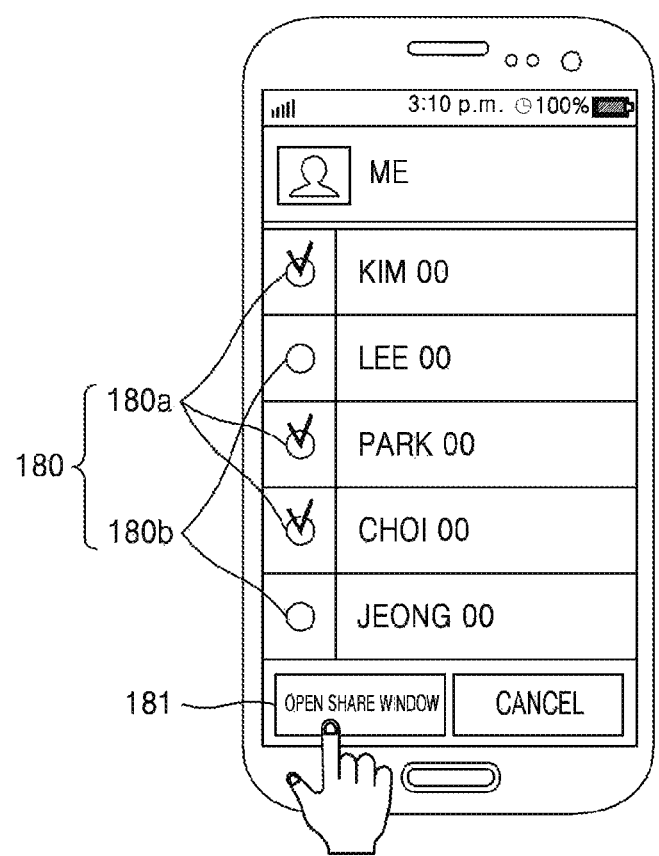
FIGS. 5A and 5B are drawings schematically illustrating an example in which a location share service is provided through the location share service providing method, according to some example embodiments.
Figure 5B:
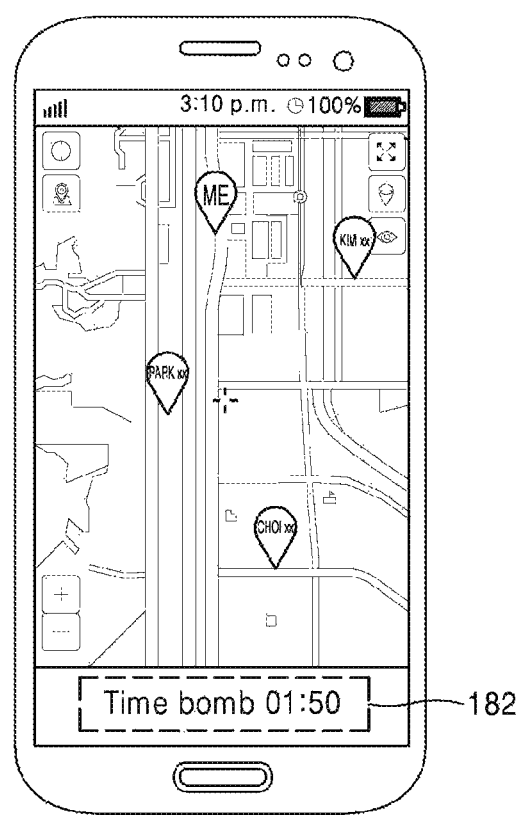

FIG. 4 is a flowchart diagram illustrating a method of providing a location share service, according to at least one example embodiment. Below, a method of providing a location share service by using the location share service providing device 100 will be described with reference to FIG. 4.

In operation S10, the location share service providing device 100 may send a location information signal and receive a location information signal to and from the external terminal 300. That is, the location share service providing device 100 may send a location information signal of the terminal 200 to the external terminal 300 and may receive a location information signal of the external terminal 300 from the external terminal 300. The location information signal may be a signal that includes real-time location information, or other location information, of the terminal 200 and/or the external terminal 300.

According to at least some example embodiments, the location share service providing device 100 may select the external terminal(s) 300 to and from which the location information signal is to be sent and received. For example, referring to FIG. 5A, the location share service providing device 100 may display a UI 180, which is used to select a target to be invited to the location share window, on a display area of the terminal 200 according to at least one example embodiment. According to at least some example embodiments, a user of the terminal 200 may select a part of the UI 180, which is used to select a target to be invited to the location share window, through a touch input, character input, or the like. The UI 180 may be configured such that a UI 180a indicating selected targets and a UI 180b indicating unselected targets are visually distinguishable. Afterwards, the location share service providing device 100 may receive an input for selecting a UI 181 that allows a user of the terminal 200 to create the location share window. For example, targets that the user of the terminal 200 intends to invite may include five targets "Kim 00", "Lee 00", "Park 00", "Choi 00", and "Jeong 00". According to at least some example embodiments, when the user of the terminal 200 selects the targets "Kim 00", "Park 00", and "Choi 00" and selects the UI 181 for creating the location share window, the location share window in which locations of users of the terminal 200 and the external terminals 300 of the selected targets "Kim 00", "Park 00", and "Choi 00" are displayed may be created.

Afterwards, the location share service providing device 100 may create the location share window in which location information of the terminal 200 and the external terminals 300 are visually displayed based on the received location information signal. For example, referring to FIG. 5B, the location share service providing device 100 may display the location share window in the display area of the terminal 200 according to at least one example embodiment. A map may be displayed in the location share window. According to at least some example embodiments, an area in which the map is displayed may be an area set by the location share service providing device 100, a specific area set by the terminal 200, an area in which locations of the terminal 200 and the external terminal 300 are included, an area in which a target location and/or location-of-interest is illustrated, etc. Furthermore, the location of each of the terminal 200 and the external terminal 300 may be displayed on the map. For example, a word (or speech) balloon having a tail, or other visual indicator, may be created at a location where the terminal 200 is currently located. An end of the tail may indicate a location on the map where the terminal 200 is currently located, and a word (e.g., a word such as "I" referencing the device or a user of the device) may be expressed in the word balloon. Word balloons in which target names are respectively expressed may be respectively created at locations where the external terminals 300 of "Kim 00", "Park 00", and "Choi 00" exist. According to at least some example embodiments, the location share service providing device 100 may output a real-time location(s) of the terminal 200 and/or the external terminal 300 via the location share window and may output a location that is received before a desired and/or fixed time. The location share service providing device 100 may display, on the location share window, a UI indicating whether location information of the terminal 200 and/or the external terminal 300 is real-time information or information about a location received before the desired and/or fixed time.

Afterwards, in operation S30, the location share service providing device 100 may measure a time lapse period from the reference time point. According to at least some example embodiments, the location share service providing device 100 may display a time, which remains until the measured time lapse period is greater than or equal to a first period, on the display area of the terminal 200. For example, referring to FIG. 5B, the location share service providing device 100 may display a UI 182, which represents a remaining time, on a partial area of the location share window displayed on the terminal 200. If a current time is 3:10 p.m. and a first time is 5:00 p.m., "0150" that represents the remaining time of 1 hour and 50 minutes may be displayed on the UI 182 representing the remaining time until the reference time.

Afterwards, in operation S40, the location share service providing device 100 may determine whether the time lapse period is greater than or equal to the first period. When the time lapse period is less than the first period, the location share service providing system 100 may check the time lapse period again.

Afterwards, in operation S50, when the time lapse period is greater than or equal to the first period, the location share service providing system 100 may delete the location share window. Deleting the location share window may mean that the terminal (or a user of the terminal) 200 exits from the location share window or may mean that location sharing among participants of the location share window is interrupted by removing the location share window itself.

For example, in the case where a situation to delete the location share window occurs, the location share service providing device 100 may interrupt an operation of sending the location information signal of the terminal 200 to the external terminal 300 and/or the server 400. The location share service providing device 100 may delete the location share window on the terminal 200 by allowing the account of the terminal 200 to be canceled from the location share window. As such, remaining external terminals 300 other than the terminal 200 may stay behind (e.g., remain in) the location share window. According to at least some example embodiments, the location share service providing device 100 may delete the location share window in response to a delete notification signal (e.g., delete notification message) that indicates the deletion of the location share window and is received from the server 400 that stores information in the location share window.

As another example, the server 400 that stores information about the location share window may directly delete the location share window. According to at least some example embodiments, the location share service providing device 100 may receive the delete notification signal (e.g., delete notification message), which indicates the deletion of the location share window, and is received from the server 400. In response to the delete notification signal, the location share service providing device 100 may interrupt an operation of sending the location information signal of the terminal 200 to the external terminal 300 or the server 400 and an operation of receiving the location information signal of the external terminal 300 from the external terminal 300 or the server 400. As such, accounts of the terminal 200 and the external terminal 300 may be canceled from the location share window, and the location share window itself may disappear.

Furthermore, the delete notification signal of the location share window sent from the server 400 may be a signal (and/or message) that the server 400 directly sends as a result of determining whether a situation to delete the location share window occurs or may be a signal (and/or message) that the server 400 generates and sends after receiving a delete request signal (and/or message) of the terminal 200 and/or the external terminal 300.

Since the location share window is deleted under various conditions as described above, the location share service providing device 100 may prevent information about its own location from being revealed for a long time regardless of an intention of a user.

Figure 6:
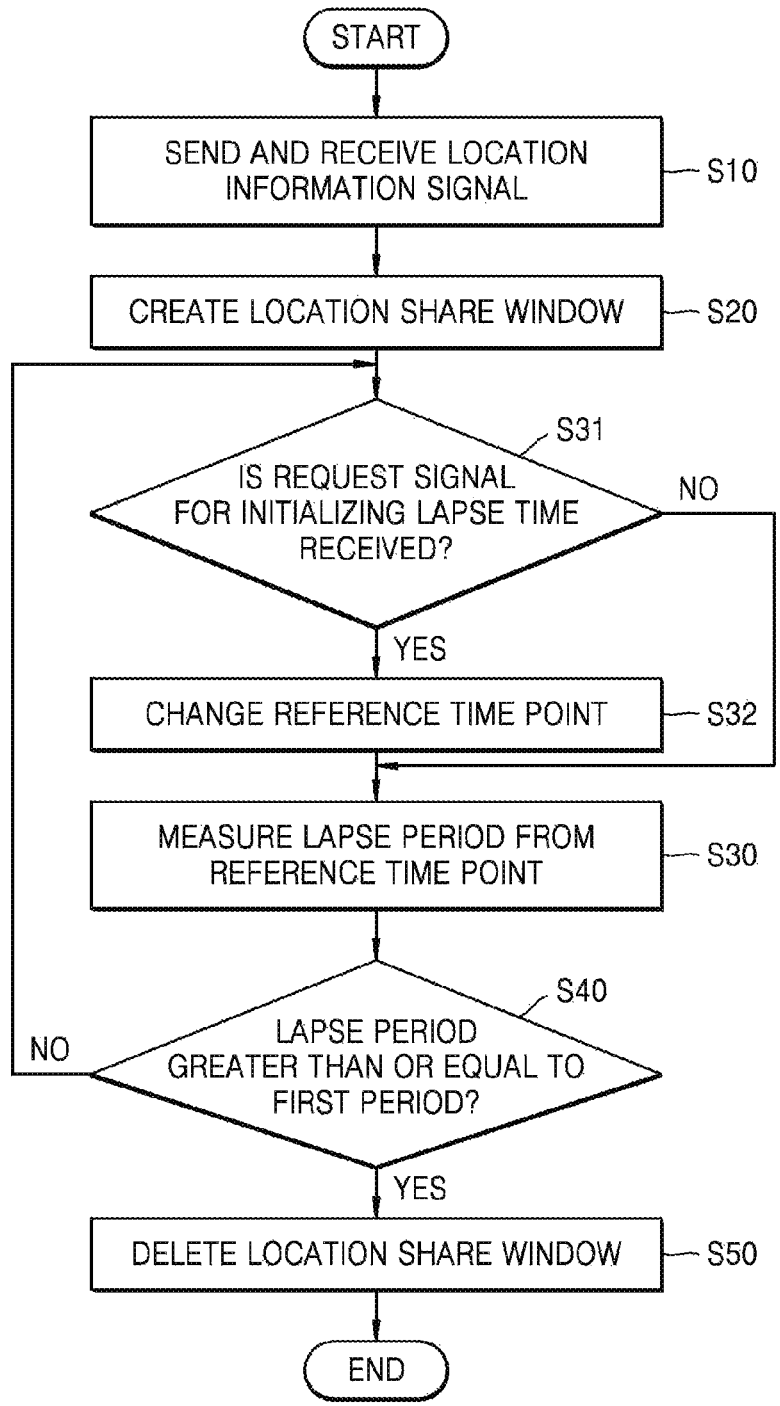
FIGS. 6 and 7 are flowchart diagrams illustrating a method of providing a location share service, according to some example embodiments.
Figure 7:
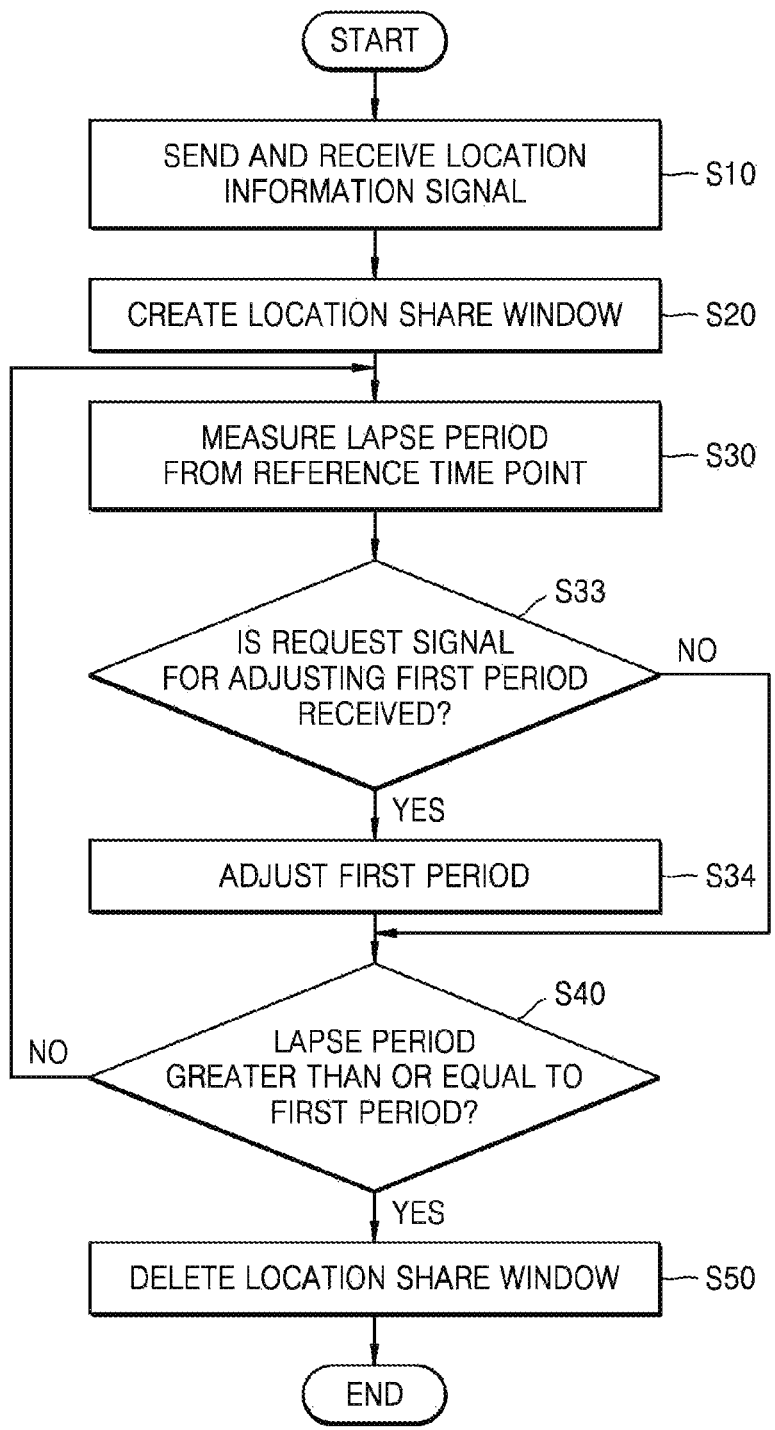

FIGS. 6 and 7 are flowchart diagrams illustrating methods of providing a location share service according to some example embodiments.

According to the at least one example embodiment illustrated in FIG. 6, in addition to the example embodiment of FIG. 4, a location share service providing method may further include determining whether a request signal (e.g., a request message) for initializing a lapse time is received from the terminal 200 or the external terminal 300 (S31) and changing a reference time point when the request signal is received (S32). That is, the location share service providing device 100 may receive an initialization request signal from the terminal 200 through the input part 130 or may receive the initialization request signal from the external terminal 300 through the communication unit 110. According to at least some example embodiments, the location share service providing device 100 may change the reference time point to a point in time when the initialization request signal is input, a point in time when the initialization request signal is sent, a point in time when the initialization request signal is received, or a point in time designated by the initialization request signal, etc.

Additionally, according to the at least one example embodiment illustrated in FIG. 7, in addition to the example embodiment of FIG. 4, the location share service providing method may further include determining whether a request signal for adjusting a length of the first period is received from the terminal 200 and/or the external terminal 300 (S33) and adjusting the first period when the request signal is received (S34). That is, the location share service providing device 100 may receive an adjustment request signal from the terminal 200 through the input part 130 or may receive the adjustment request signal from the external terminal 300 through the communication unit 110. According to at least some example embodiments, the location share service providing device 100 may adjust the length of the first period on the basis of the adjustment request signal. For example, referring to FIG. 8(*a*), the location share service providing device 100 may display a UI 183, which is used to adjust a length of the first period, on the display area of the terminal 200. According to at least some example embodiments, a user of the terminal 200 may select the UI 183, which is used to adjust a length of the first period, through a touch input or the like.

Figure 8C:
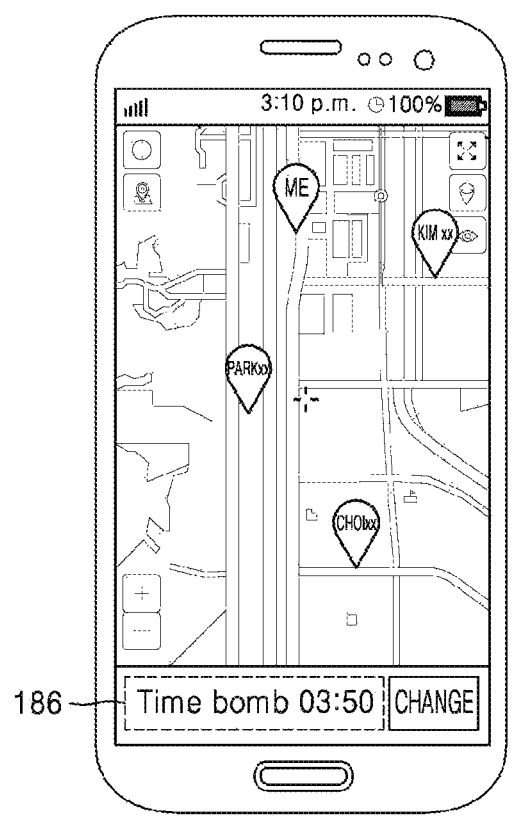

Afterwards, the location share service providing device 100 may display a UI 184, which is used to select a length of the first period to be changed, on the display area of the terminal 200 and may receive an input for selecting a length of the first period to be changed from a user of the terminal 200. For example, referring to FIG. 8B, the location share service providing device 100 may display, on the display area of the terminal 200, a UI for changing the length of the first period into a desired and/or fixed time, such as one hour, two hours, two and a half hours, etc., and may display, on the display area of the terminal 200, the length of the first period such that the location share window is maintained up to a specific time, such as "1900", "2100", "2300", etc. In the case where the user of the terminal 200 selects a UI 185 for changing a duration of the location share window to the specific time of "1900", as illustrated in FIG. 8C, the location share service providing system 100 may display "0350", which represents a remaining time from 3:10 p.m. (a current time) to 7:00 p.m., i.e., 3 hours and 50 minutes, on a UI 186 representing the remaining time.

The location share service providing device 100 may receive a signal and/or message (hereinafter referred to as "duration change request signal") for requesting a duration change about the location share window from the external terminal 300, not the terminal 200. According to at least some example embodiments, the location share service providing system 100 may adjust the duration of the location share window by a desired length corresponding to the duration change request signal. The location share service providing system 100 may adjust the duration of the location share window only when an assent signal (e.g., assent message) with respect to the adjustment of the duration is received. Even though the duration change request signal with respect to the location share window is received from the terminal 200, the location share service providing device 100 may adjust the duration of the location share window only when an assent signal with respect to the changing of the duration is received from the external terminal 300.

Since users, who participate in the location share window, are allowed to change the duration of the location share window, the location share service providing device 100 may allow the location share window to be maintained for a desired time requested by the users.

Figure 9:
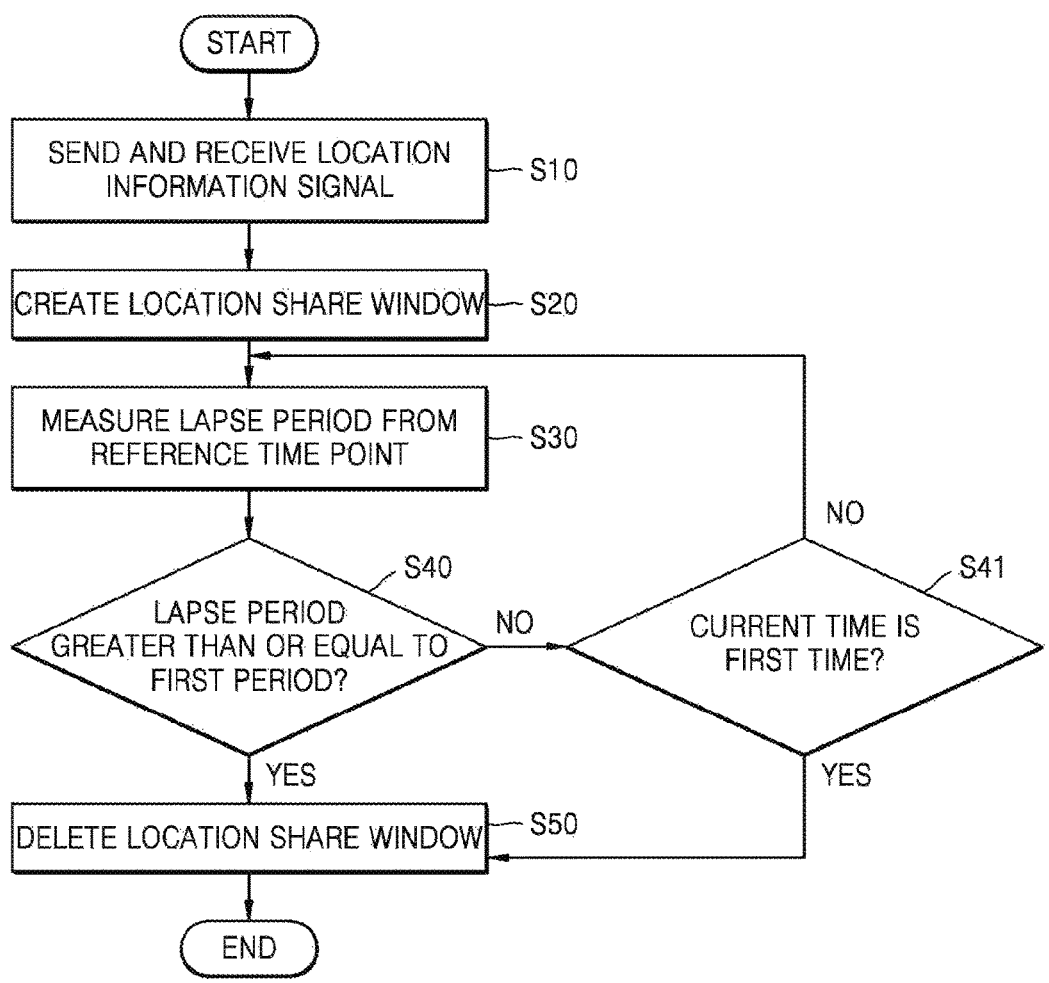
FIG. 9 is a flowchart diagram illustrating an example of a method of providing a location share service, according to at least one example embodiment.

Additionally, according to at least one example embodiment illustrated in FIG. 9, in addition to the example embodiment illustrated in FIG. 4, the location share service providing method may further include determining whether a current time is a first time, at the location share service providing device 100 (S41). That is, even though the time lapse period is less than a first period, the location share service providing system 100 may delete the location share window when the current time is the first time (e.g., the current time reaches the designated first time). According to at least some example embodiments, the first time may be a desired and/or configurable time that is set in the location share service providing device 100 and/or the terminal 200, and/or may be a time that is designated by the user of the terminal 200. For example, in the case where the user of the terminal 200 designates 3:00 a.m. every Sunday as the first time, when a current time is the first time, the location share service providing device 100 may delete the location share window at 3:00 a.m. on every Sunday regardless of whether the time lapse period is greater than or equal to the first period.

FIGS. 10A to 10E are flowchart diagrams illustrating a method of providing a location share service, according to some example embodiments.

Figure 10A:
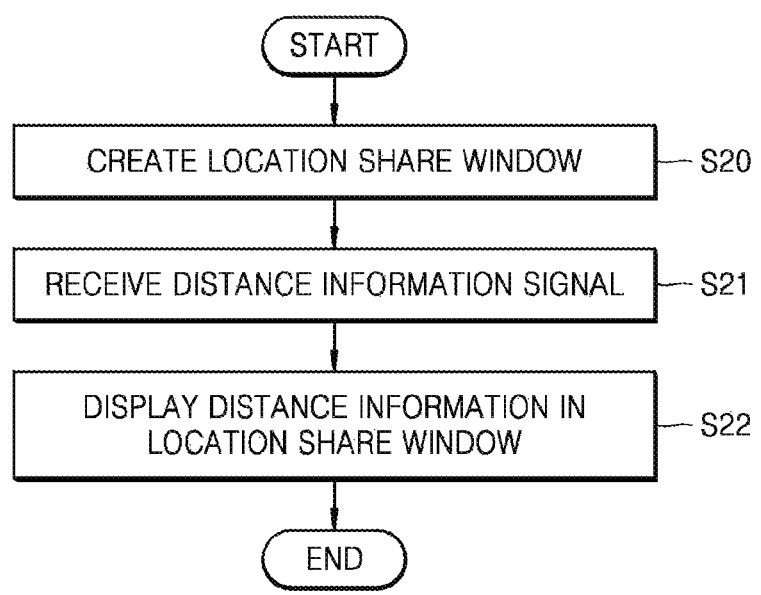
FIGS. 10A to 10E are flowchart diagrams illustrating examples of a method of providing a location share service, according to some example embodiments.
Figure 11:
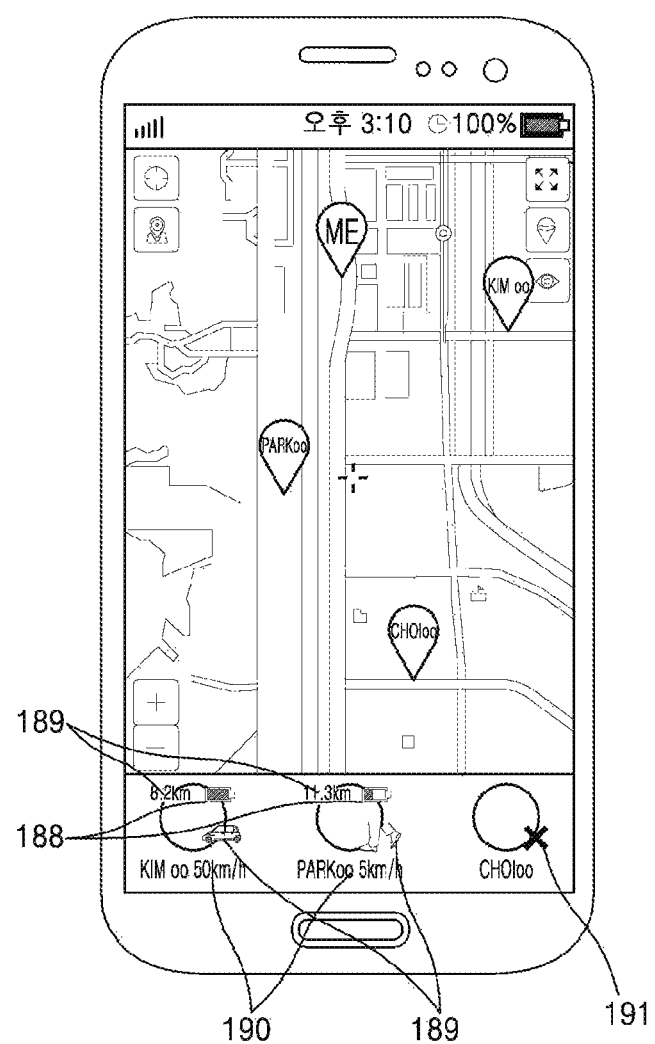
FIG. 11 is a drawing schematically illustrating an example in which a location share service is provided through the location share service providing method, according to at least one example embodiment.

According to at least one example embodiment illustrated in FIG. 10A, in addition to the example embodiment illustrated in FIG. 4, the location share service providing method may include generating the location share window (S20), receiving a signal including information about a distance from a first location to the external terminal 300 (S21), and displaying the distance information in the location share window (S22). According to at least some example embodiments, the first location may be a location of the terminal 200 or may be a specific location that is designated by the terminal 200 and/or the external terminal 300. For example, referring to FIG. 11, the location share service providing device 100 may display a UI 187, which represents a distance from the first location to each external terminal 300, around a profile of each of the graphical representations of the users of the external terminals 300, such as "Kim 00", "Park 00", and "Choi 00". Additionally, the location share service providing device 100 may display a distance from the first location to each external terminal 300 around a word balloon indicating a location of the external terminals 300, such as the graphical representations of "Kim 00", "Park 00", and "Choi 00".

Figure 10B:
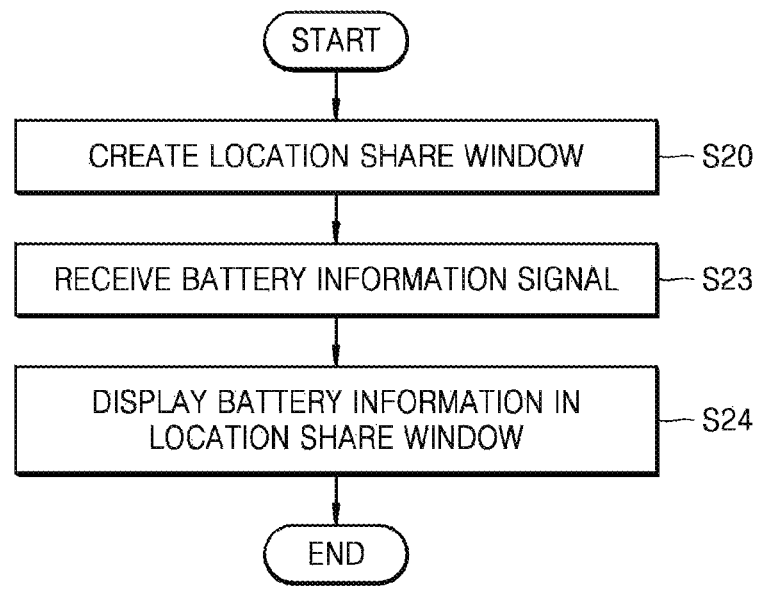

According to at least one example embodiment illustrated in FIG. 10B, in addition to the example embodiment illustrated in FIG. 4, the location share service providing method may include creating the location share window (S20), receiving a signal including battery information of the external terminal 300 (S23), and displaying the battery information in the location share window (S24). For example, referring to FIG. 11, the location share service providing device 100 may display a UI 188, which represents battery information of each external terminal 300, around a profile of each user, such as "Kim 00", "Park 00", and "Choi 00". Additionally, the location share service providing device 100 may display battery information of each external terminal 300 around a word balloon (e.g., a graphical representation or icon) indicating a location of the external terminal 300 associated with each user, such as "Kim 00", "Park 00", and "Choi 00".

Figure 10C:
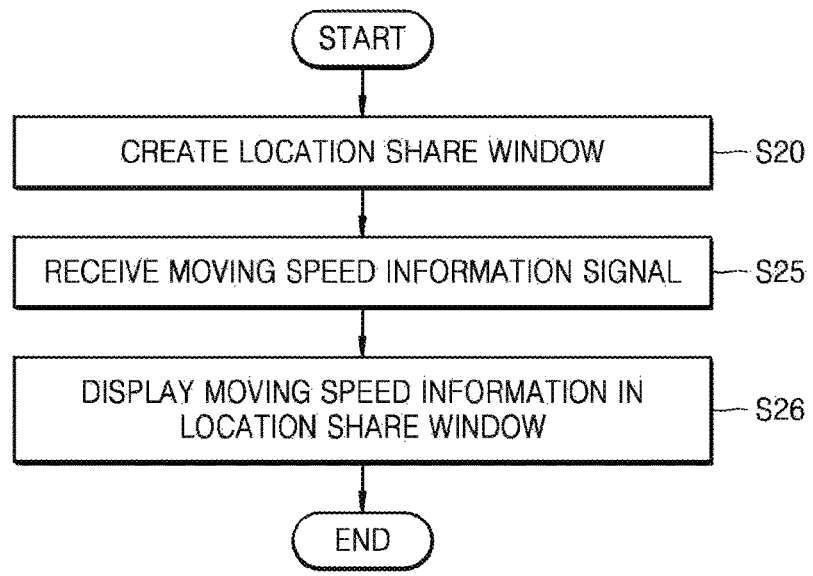

According to at least one example embodiment illustrated in FIG. 10C, in addition to the example embodiment illustrated in FIG. 4, the location share service providing method may include creating the location share window (S20), receiving a signal including information about a moving speed (e.g., current velocity, average velocity, a current traveling speed, an average traveling speed, etc.) with which the external terminal 300 moves (S25A), and displaying the moving speed information in the location share window (S26). For example, referring to FIG. 11, the location share service providing device 100 may display a UI 189, which represents the moving speed information of each external terminal 300, around a profile of each user, such as "Kim 00", "Park 00", and "Choi 00". Additionally, the location share service providing device 100 may display the moving speed information of each external terminal 300 around a word balloon (e.g., graphical representation, icon, etc.) indicating a location of the external terminal 300 of each user associated with the external terminal 300, such as "Kim 00", "Park 00", and "Choi 00".

Figure 10D:
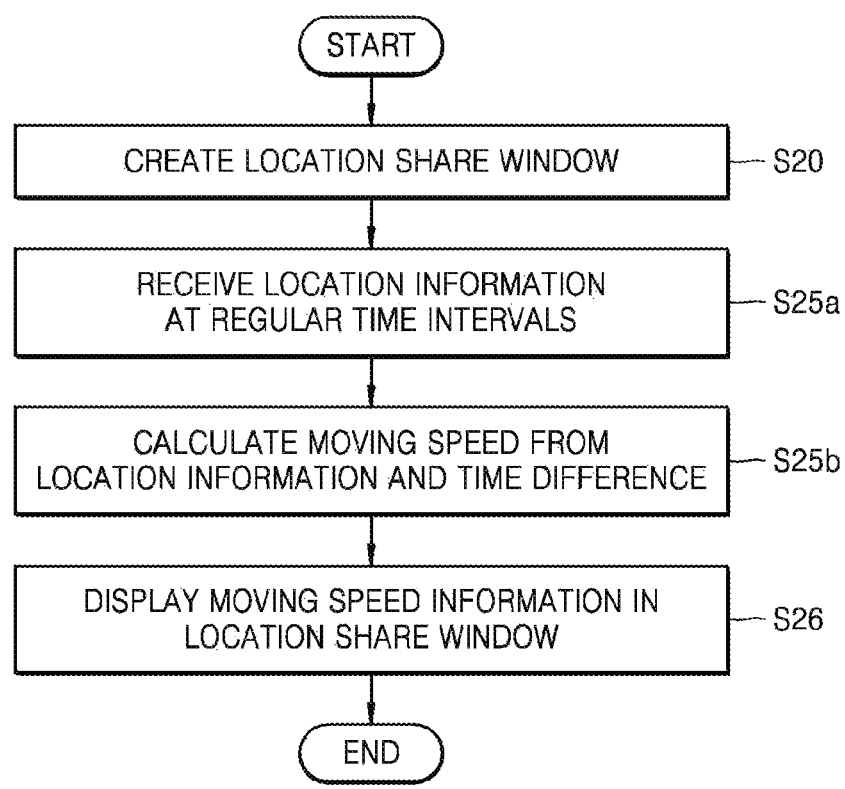

According to at least one example embodiment illustrated in FIG. 10D, in addition to the example embodiment illustrated in FIG. 4, the location share service providing method may include creating the location share window (S20), repeatedly and/or continuously receiving a signal and/or message including information about a location of the external terminal 300 (S25Aa) at regular time intervals, calculating a moving speed of each external terminal 300 from the repeatedly received location information (S25b), and displaying information about the calculated moving speed in the location share window (S26). That is, after receiving a signal including information about a location of the external terminal 300, the terminal 200 and/or the location share service providing device 100 may calculate a moving speed of the external terminal 300 based on the received signal. Additionally, the external terminal 300 and/or the terminal 200 may calculate its own moving speed through the use of sensors (e.g., using accelerometers, gyroscopes, GPS sensors, etc.) installed on the external terminal 300 and/or the terminal 200 and transmit the self-calculated moving speed in the transmitted signal and/or message.

Figure 10E:
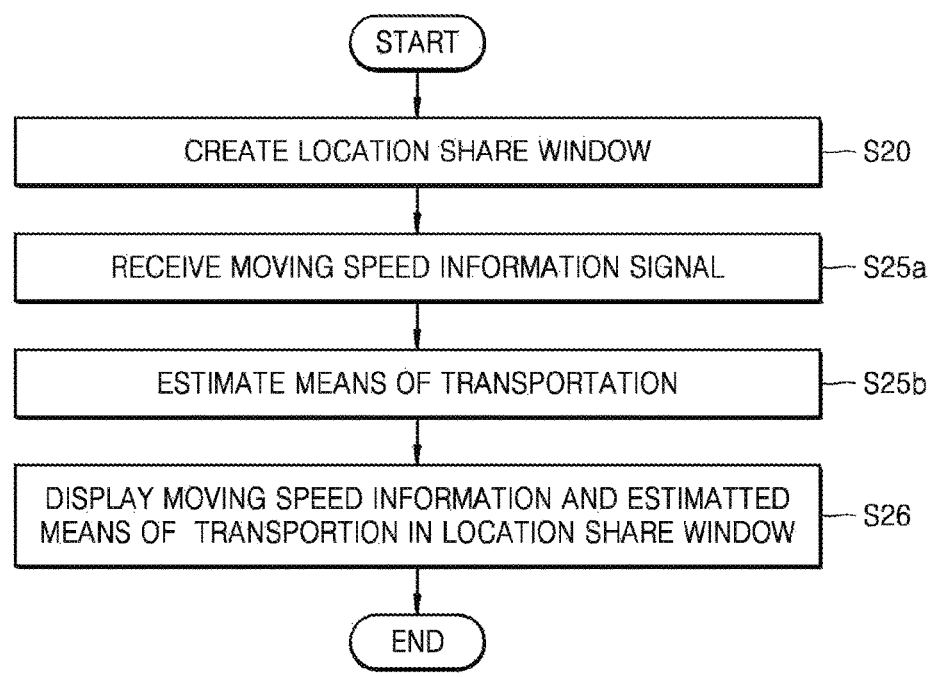

According to at least one example embodiment illustrated in FIG. 10E, in addition to the example embodiment illustrated in FIG. 4, the location share service providing method according to at least one example embodiment may include creating the location share window (S20), receiving a signal including information about a moving speed of the external terminal 300 (S25A), estimating a means of transportation (e.g., transportation type information) of a user of the external terminal 300 (S25B) (e.g., car, bus, subway train, bicycle, walking, etc.), and displaying information about the moving speed and the estimated means of transportation in the location share window (S26). For example, referring to FIG. 11, the location share service providing device 100 may display a UI 189, which represents moving speed information of each external terminal 300, around a profile of each user, such as "Kim 00", "Park 00", and "Choi 00", together with a UI 190 representing the means of transportation estimated based on each moving speed information. That is, in the case where the external terminal 300 of "Kim 00" moves at a moving speed of 50 km/h, the location share service providing device 100 may estimate the means of transportation of "Kim 00" as a vehicle and may display a UI of a car shape around a profile of "Kim 00". In the case where the external terminal 300 of "Park 00" moves at a moving speed of 5 km/h, the location share service providing device 100 may estimate "Park 00" as moving on foot and may display a UI of a walking shape around a profile of "Park 00". Additionally, the location share service providing device 100 may display information about the means of transportation, which is estimated with respect to the external terminals 300, around word balloons (e.g., graphical representation, icon, etc.) indicating locations of the external terminals 300 of the users "Kim 00", "Park 00", and "Choi 00", respectively.

Meanwhile, the location share service providing device 100 may temporarily interrupt an operation of sending the location information signal and/or message of the terminal 200 and may resume the operation of sending the location information signal and/or message of the terminal 200. According to at least some example embodiments, information indicating that location information is not received from the terminal 200 may be displayed on the external terminal 300 of another person. For example, referring to FIG. 11, in the case where a location information signal is not received from the external terminal 300 of "Choi 00", the location share service providing device 100 may display "X" 191 as a UI indicating that a signal is not received, around a profile of "Choi 00".

The location share service providing device 100 may provide a variety of information about the user of the external terminal 300 to the user of the terminal 200 by displaying UIs indicating a variety of information in the location share window.

Figure 12:
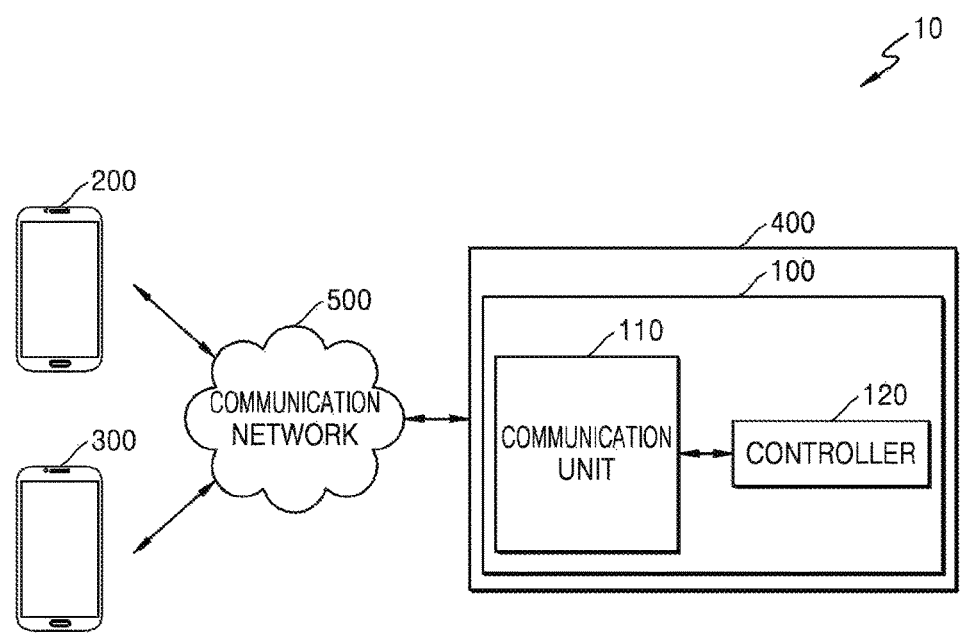
FIG. 12 is a drawing schematically illustrating a configuration of a location share service providing system according to at least one example embodiment.

FIG. 12 is a drawing schematically illustrating a configuration of a location share service providing system according to at least one example embodiment.

Referring to FIG. 12, the server 400 may include the location share service providing device 100. Additionally, the server 400 itself may be the location share service providing device 100. That is, the terminal 400 in which an application or a computer program for a location share service is installed may perform its own function together with a function of the location share service providing device 100. The location share service providing device 100 included in the server 100 may include the communication unit 110 and the controller 120, etc., according to at least one example embodiment. Below, descriptions the same as descriptions given with reference to FIGS. 1 to 11 may be omitted.

The communication unit 110 may receive location information signals and/or messages from the plurality of terminals 200 and 300. Furthermore, the communication unit 100 may send the received location information signals to at least one of the plurality of terminals 200 and 300.

The communication unit 110 may receive an initialization request signal and/or message for initializing a time lapse period from at least one of the plurality of terminals 200 and 300. Additionally, the communication unit 110 may receive a length adjustment request signal and/or message for adjusting a length of a first period from at least one of the plurality of terminals 200 and 300.

Furthermore, the communication unit 110 may receive at least one of a signal and/or message including information about distances among the plurality of terminals 200 and 300 from the plurality of terminals 200 and 300 and/or a desired target location or a desired location of interest, a signal and/or message including information of a battery remaining capacity of one or more of the plurality of terminals 200 and 300, and a moving speed information signal and/or message of one or more of the plurality of terminals 200 and 300. When at least one of the above-described signals/messages is received, the communication unit 100 may send the at least one signal/message to at least one of the plurality of terminals 200 and 300.

Furthermore, in the case where at least one terminal enters the inside of a desired first area (e.g., a target area), which is set on a map displayed on the location share window, from outside of the first area and in the case where a terminal leaves the inside of the first area, the communication unit 110 may send a notification signal about the at least one case to at least one of the plurality of terminals 200 and 300.

According to at least some example embodiments, the communication unit 110 may be included in an element that performs wired and/or wireless communication with an external electronic device on the terminal 400. Additionally, the element of the server 400 itself may be the communication unit 110 of the location share service providing device 100.

The controller 120 may allocate a memory, which is needed to provide the location share service, on the server 400 in response to a request from at least one of the plurality of terminals 200 and 300.

Furthermore, the controller 120 may measure a time lapse period from the reference time point. In the case where the time lapse period is greater than or equal to the first period, the controller 120 may release memory allocation for the location share service and may interrupt an operation of sending a location information signal to at least one of the plurality of terminals 200 and 300.

When a change request signal/message about the reference time point or the first period is received from at least one of the plurality of terminals 200 and 300, the controller 120 may adjust the reference time point or the first period based on request contents of the received signal/message.

Furthermore, the controller 120 may set a specific area of a map displayed on the location share window as a first area. The controller 120 may set the first area based on a request from at least one of the plurality of terminals 200 and 300. The first area may have various shapes such as a circle, an oval, a polygon, etc., and/or may correspond to a geographical location or feature (e.g., streets, neighborhoods, provincial boundaries, etc.).

According to at least some example embodiments, the controller 120 may be included in an element of the server 400 which controls an overall operation of the server 400. Additionally, a corresponding element of the server 400 itself may be the controller 120 of the location share service providing device 100.

Figure 13:
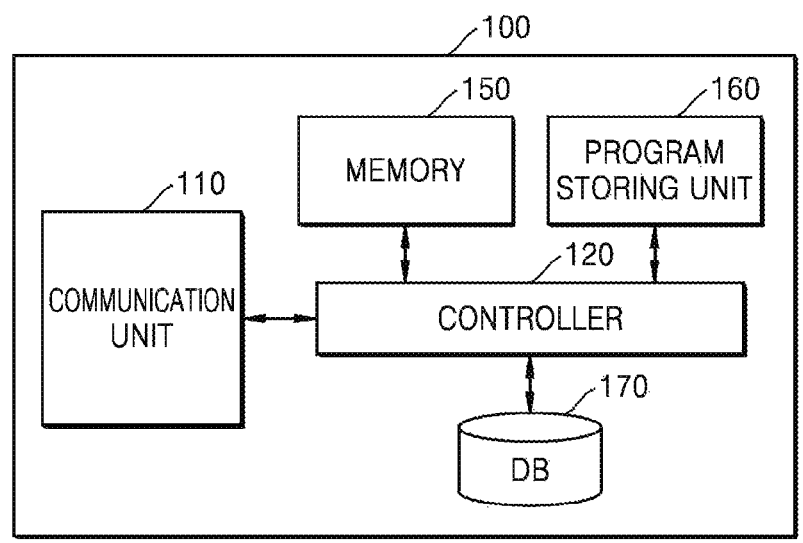
FIG. 13 is a block diagram schematically illustrating an internal configuration of the location share service providing method of FIG. 12 according to at least one example embodiment.

Referring to FIG. 13, the location share service providing device 100 may further include the memory 150, the program storing unit 160, and a database 170 in addition to the communication unit 110 and the controller 120, etc., according to at least one example embodiment.

The memory 150 may temporarily or permanently store data that the controller 120 processes. Here, the memory 150 may include, but is not limited to, magnetic storage media, flash storage media, etc. The memory 150 may store data that is sent or received to or from the plurality of terminals 200 and 300. According to at least some example embodiments, the memory 150 may be included in an element that temporarily or permanently stores data processed at the server 400. Additionally, the element of the server 400 itself may be the memory 150 of the location share service providing device 100.

The program storing unit 160 may be an element that includes software (e.g., computer readable instructions) that when executed by at least one processor, causes the at least one processor to perform various tasks supplementary or indispensable to a process of sending and receiving data associated with the location share window. In other words, the computer readable instructions of the software stored on the program storing unit 160, when executed by the at least one processor, transforms the processor into a special purpose processor configured to perform the computer readable instructions. According to at least some example embodiments, the program storing unit 160 may be included in an element of the server 400 that includes software performing various tasks supplementary or indispensable to driving the server 400. Additionally, the element of the server 400 itself may be the program storing unit 160 of the location share service providing device 100.

The database 170 may store data that at least one of the plurality of terminals 200 and 300 sends and receives. According to at least some example embodiments, the database 170 may be included in an element that stores and manages a variety of data at the terminal 200 or 300. Additionally, the element of the server 400 itself may be the database 170 of the location share service providing device 100.

Figure 14:
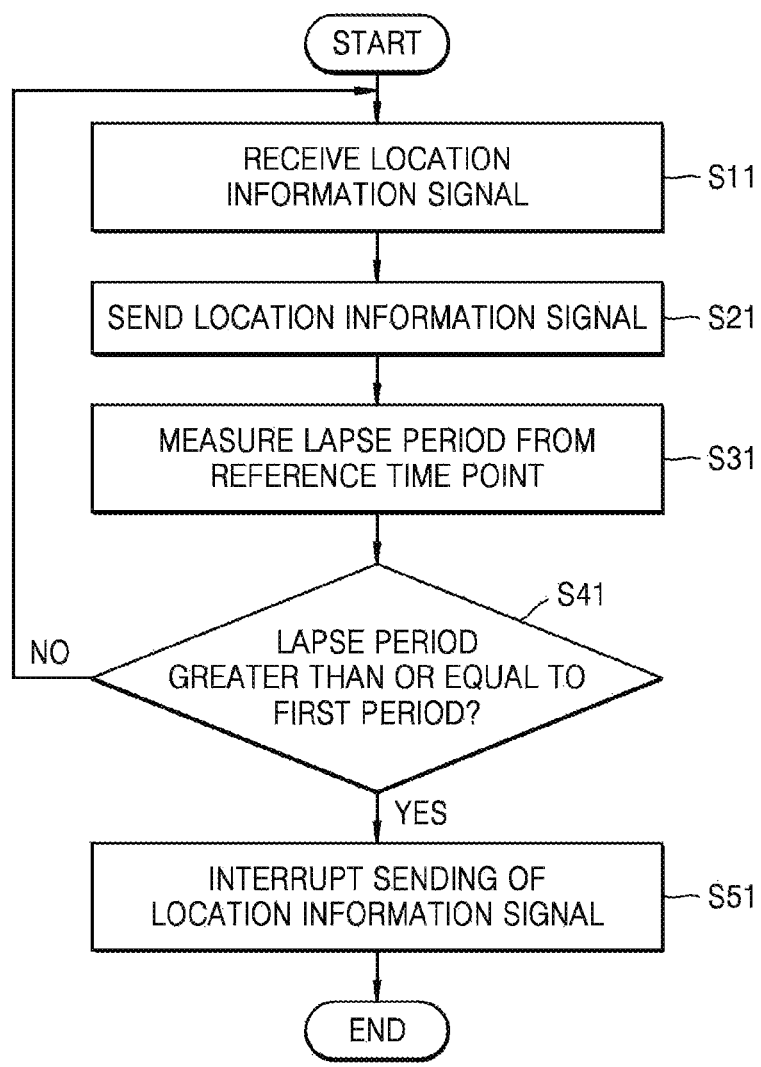
FIG. 14 is a flowchart diagram illustrating a method of providing a location share service, according to at least one example embodiment.

FIG. 14 is a flowchart diagram illustrating a method of providing a location share service, according to at least one example embodiment. Below, a method of providing a location share service by using the location share service providing device 100 included in the server 400 will be described with reference to FIG. 14. Below, descriptions the same as the descriptions given with reference to FIGS. 1 to 13 will be omitted.

In operation S11, the location share service providing device 100 may receive location information signals each including information about a location of each of the terminals 200 and 300.

In operation S21, the location share service providing device 100 may send the location information signals to at least one of the plurality of terminals 200 and 300. According to at least some example embodiments, the location share service providing device 100 may allocate a memory, which is needed to provide a location share service between the terminals 200 and 300, on the server 400.

Afterwards, in operation S31, the location share service providing device 100 may measure a time lapse period from the reference time point.

In operation S41, the location share service providing device 100 may determine whether the time lapse period is greater than or equal to a first period. When the determination result indicates that the time lapse period is greater than or equal to the first period, in operation S51, the location share service providing system 100 may interrupt an operation of sending the location information signal to at least one of the plurality of terminals 200 and 300. When the determination result indicates that the time lapse period is less than the first period, the location share service providing system 100 may resume the operation of sending the location information signal to at least one of the plurality of terminals 200 and 300.

The location share service providing method may provide a location share service that enables the transmitting and receiving of location information signals including information about the locations of mobile devices and to interrupt the transmitting and receiving of the location information signal when a condition is satisfied. Furthermore, the location share service providing method may provide a location share service that makes it possible to share both simple location information and a variety of information in sending and receiving location information signals, including information about the locations of devices, the speed of devices, etc., between devices.

According to at least some example embodiments,

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of sharing, with one or more external mobile devices, a location of a first mobile device, which performs electronic communication with the one or more external mobile devices, the method comprising:

transmitting, using at least one processor of the first mobile device, a first location information signal to at least one external mobile device;

receiving, using the at least one processor, a second location information signal from the at least one external mobile device in response to the first location information signal;

generating, using the at least one processor, a location share window, the location share window including visual display of location information of the first mobile device and the at least one external mobile device, based on the first and second location information signals;

measuring, using the at least one processor, a desired time lapse period from a reference time point;

deleting, using the at least one processor, the location share window when the measured time lapse period is greater than or equal to a first period, wherein the reference time point is a point in time when the location share window is created;

receiving, using the at least one processor, a specific information signal including distance information related to distances between the first mobile device and the at least one external mobile device and moving speed information related to each of the external mobile devices;

determining, using the at least one processor, moving speed information related to the first mobile device;

estimating, using the at least one processor, transportation type information corresponding to each external mobile device based on the moving speed information related to each of the external mobile devices and the first mobile device;

controlling, using the at least one processor, displaying of transportation type information visually in the location share window; and transmitting, using the at least one processor, the received specific information signal including the moving speed information related to each of the external mobile devices and the moving speed information related to the first mobile device, to each of the at least one external mobile devices.

2. The method of claim 1, wherein the measuring comprises:

receiving, using the at least one processor, an initialization request signal for initializing the measured time lapse period from at least one of the first mobile device and the at least one external mobile device; and changing, using the at least one processor, the reference time point based on the initialization request signal.

3. The method of claim 1, wherein the deleting comprises:

receiving, using the at least one processor, an adjustment request signal for adjusting a length of the first period from at least one of the first mobile device and the at least one external mobile device; and adjusting, using the at least one processor, the length of the first period based on the adjustment request signal.

4. The method of claim 1, wherein the deleting comprises:
deleting, using the at least one processor, the location share window when a current time is a first time.

5. The method of claim 1, wherein the deleting comprises:
receiving, using the at least one processor, a delete notification signal from a server configured to store information about the location share window, the delete notification signal indicating a deletion of the location share window;
interrupting, using the at least one processor, the transmitting and receiving of the location information signals between the first mobile device and the at least one external mobile device; and
deleting, using the at least one processor, the location share window.

6. The method of claim 5, further comprising:
transmitting, using the at least one processor, a delete request signal to the server before the receiving of the delete notification signal, the delete request signal including a request to delete the location share window.

7. The method of claim 1, wherein the deleting comprises:
interrupting the transmitting of the first location information signal of the first mobile device to the at least one external mobile device; and
exiting from the location share window.

8. The method of claim 1, further comprising:
controlling, using the at least one processor, displaying of the distance information visually in the location share window based on the specific information signal,
wherein a first location of the distance information is the location of the first mobile device or at least one location set by at least one of the first mobile device and the at least one external mobile device.

9. The method of claim 1, further comprising:
controlling, using the at least one processor, displaying of the battery remaining information visually in the location share window based on the specific information signal.

10. The method of claim 1, further comprises:
controlling, using the at least one processor, displaying of the moving speed information visually in the location share window based on the specific information signal.

11. The method of claim 1, further comprising:
setting, using the at least one processor, a first area on a map displayed on the location share window; and
outputting, using the at least one processor, a notification when a location the at least one external mobile device changes from being inside the first area to being outside the first area or changes from being outside the first area to being inside the first area.

12. The method of claim 1, further comprising:
interrupting, using the at least one processor, the transmitting of the first location information signal of the first mobile device to the one or more external mobile devices.

13. The method of claim 12, wherein the interrupting of the transmitting the first location information signal further comprises:
resuming, using the at least one processor, the transmitting of the first location information signal of the first mobile device to the at least one external mobile device.

14. A method of providing location information of each of a plurality of mobile devices to at least one of the plurality of mobile devices, the method comprising:
receiving, using at least one processor of a first mobile device of the plurality of mobile devices, a first location information signal of each of the plurality of mobile devices from the at least one of the plurality of mobile devices;
transmitting, using the at least one processor, a second location information signal to the at least one of the plurality of mobile devices;
measuring, using the at least one processor, a time lapse period from a reference time point; and
interrupting, using the at least one processor, the transmitting of the second location information signal to the at least one of the plurality of mobile devices when the measured time lapse period is greater than or equal to a first period,
wherein an initial value of the reference time point is a point in time when the second location information signal is transmitted to the at least one of the plurality of mobile devices;
receiving, using the at least one processor, a specific information signal including distance information related to distances between the first mobile device and each of the plurality of mobile devices and moving speed information related to each of the plurality of mobile devices;
determining, using the at least one processor, moving speed information related to the first mobile device;
estimating, using the at least one processor, transportation type information corresponding to each of the at least one of the plurality of mobile devices based on the moving speed information related to each of the at least one of the plurality of mobile devices and the first mobile device;
controlling, using the at least one processor, displaying of transportation type information visually in a location share window; and
transmitting, using the at least one processor, the received specific information signal including the moving speed information related to each of the plurality of mobile devices and the moving speed information related to the first mobile device to each of the plurality of mobile devices.

15. The method of claim 14, wherein the measuring comprises:
receiving, using the at least one processor, an initialization request signal for initializing the measured time lapse period from at least one of the plurality of mobile devices; and
changing, using the at least one processor, the reference time point based on the initialization request signal.

16. The method of claim 14, wherein the interrupting comprises:
receiving, using the at least one processor, an adjustment request signal for adjusting a length of the first period from at least one of the plurality of mobile devices; and
adjusting, using the at least one processor, the length of the first period based on the adjustment request signal.

17. A system for providing location information to a plurality of mobile devices using a first mobile device, the system comprising:
a memory having computer readable instructions stored thereon; and
at least one processor configured to execute the computer readable instructions to,
periodically determine current location information related to the first mobile device using at least one location sensor,
periodically transmit a first location information message to at least one external mobile device of the plurality of mobile devices, the first location information message including the determined current location information, periodically receive a second location information message from the at least one external mobile device, the second location information message including current location information of the at least one external mobile device, periodically receive a specific information signal including distance information related to distances between the first mobile device and the at least one external mobile device and moving speed information related to each of the at least one external mobile device, determine moving speed information related to the first mobile device, estimate a transportation type information corresponding to each of the at least one external mobile device based on the moving speed information related to each of the at least one external mobile device and the first mobile device, periodically transmit the received specific information signal including the moving speed information related to each of the external mobile devices, and the moving speed information related to the first mobile device corresponding to each of the at least one external mobile devices, periodically generate a graphical user interface (GUI), the GUI including a map including the determined current location information, the current location information of the at least one external mobile device, the distance information related to distances between the first mobile device and the at least one external mobile device, moving speed information related to the at least one external mobile device and the first mobile device, and transportation type information corresponding to each of the at least one external mobile devices and display the GUI on a display panel of the first mobile device.

18. The system of claim 17, wherein the at least one processor is further configured to execute the computer readable instructions to:
receive user input related to a desired time to discontinue the periodic transmission of the first location information message;
determine whether the desired time has been reached; and
transmit a delete GUI message to the at least one external mobile device, the delete GUI message including instructions causing the at least one external mobile device to delete a GUI generated on the at least one external mobile device.

19. The system of claim 18, wherein the at least one processor is further configured to execute the computer readable instructions to:
receive user input related to point of interest information related to a point of interest to be shared;
transmit the point of interest information to the at least one external mobile device; and
wherein the map includes the point of interest information, a distance between the determined current location information and the point of interest information related to the first mobile device, and a distance between the current location information of the at least one external mobile device and the point of interest information.

20. The system of claim 18, wherein the at least one processor is further configured to execute the computer readable instructions to:
receive user input related to boundary information of a desired area;
transmit the boundary information to the at least one external mobile device; and
wherein the map includes the boundary information of the desired area, information related to whether the determined current information related to the first mobile device is located inside or outside of the desired area, and information related to whether the current location of the at least one external mobile device is located inside or outside of the desired area.

* * * * *